(12) United States Patent
Cummins

(10) Patent No.: US 6,752,434 B2
(45) Date of Patent: Jun. 22, 2004

(54) TUBE EXPANSION JOINT

(76) Inventor: Richard D. Cummins, 33 Harmony Cir., Orchard Park, NY (US) 14127

( * ) Notice: Subject to any disclaimer, the term of this patent is extended or adjusted under 35 U.S.C. 154(b) by 0 days.

(21) Appl. No.: 10/105,581

(22) Filed: Mar. 25, 2002

(65) Prior Publication Data

US 2002/0158464 A1 Oct. 31, 2002

Related U.S. Application Data

(63) Continuation-in-part of application No. 09/593,788, filed on Jun. 14, 2000, now abandoned.
(60) Provisional application No. 60/139,203, filed on Jun. 15, 1999.

(51) Int. Cl.[7] .......................... F16L 39/00; F16L 39/04; F16L 37/00
(52) U.S. Cl. ................. 285/124.1; 285/121.1; 285/312; 138/26
(58) Field of Search .................... 285/121.1, 121.2, 285/124.1, 124.2, 11, 101, 301, 302, 224, 226, 41, 47, 412; 138/26, 28, 31; 166/355; 406/192, 196

(56) References Cited

U.S. PATENT DOCUMENTS

| 853,964 A | * | 5/1907 | Doolittle ................... 285/302 |
| 853,974 A | | 5/1907 | Hayden |
| 3,874,706 A | | 4/1975 | Arnold ......................... 285/24 |
| 3,944,263 A | | 3/1976 | Arnold ......................... 285/96 |
| 3,955,621 A | * | 5/1976 | Webb .......................... 166/355 |
| RE29,054 E | * | 11/1976 | Lange ...................... 285/124.3 |
| 4,213,640 A | * | 7/1980 | Miles ....................... 285/124.2 |
| 4,317,586 A | | 3/1982 | Campbell ..................... 285/95 |
| 4,487,435 A | | 12/1984 | Yamatani ...................... 285/94 |
| 4,615,542 A | | 10/1986 | Ideno et al. ................... 285/11 |
| 4,875,716 A | * | 10/1989 | Winzen et al. ........... 285/124.4 |
| 5,017,054 A | * | 5/1991 | Gideon et al. .............. 406/191 |
| 6,406,066 B1 | * | 6/2002 | Uegane ................... 285/124.1 |

FOREIGN PATENT DOCUMENTS

| DE | 1 193 000 | 5/1965 |
| GB | 2 118 263 A | 10/1983 |

* cited by examiner

Primary Examiner—Matthew C. Graham
Assistant Examiner—Melody M. Burch
(74) Attorney, Agent, or Firm—Simpson & Simpson, PLLC

(57) ABSTRACT

A junction for connecting first and second adjacent sections in a guideway carrying pressurized fluid comprises female end portions on a first section, male end portions on a second section partially received within the female end portions, and a vessel. The vessel comprises a plenum bounded at one end by a piston. The plenum is in flow communication with a pressure source.

7 Claims, 12 Drawing Sheets

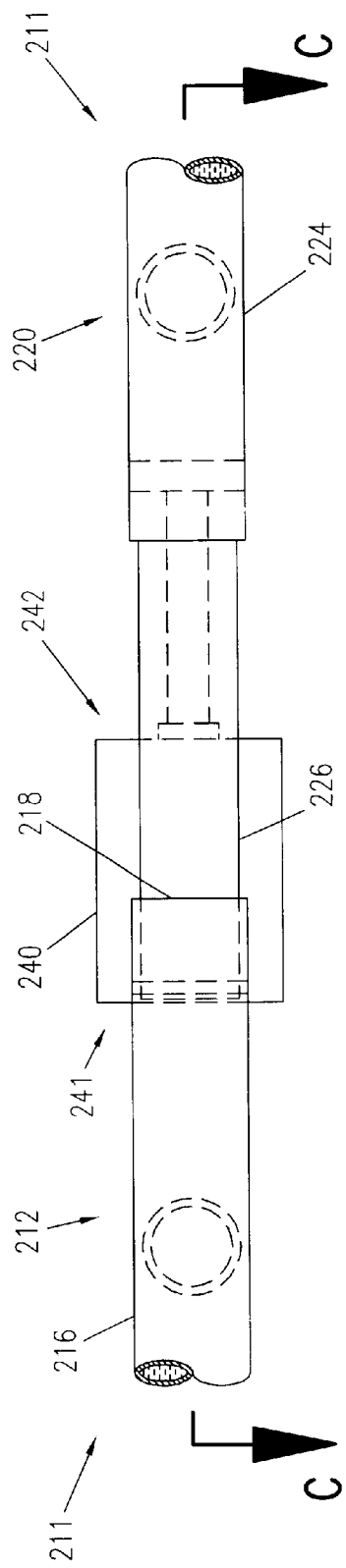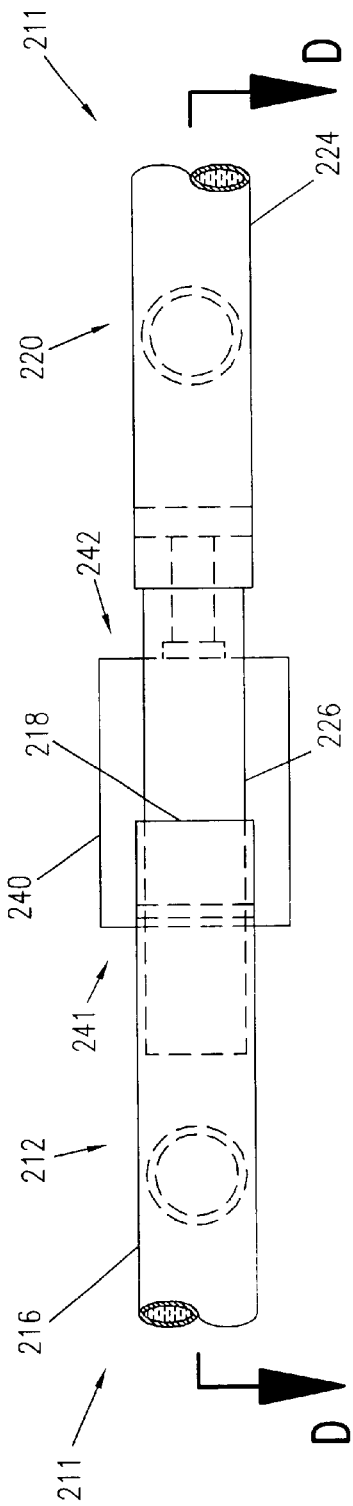

TUBE EXPANSION JOINT

CROSS-REFERENCE TO RELATED APPLICATIONS

The instant application claims priority of U.S. Ser. No. 09/593,788, filed Jun. 14, 2000, and abandoned Jul. 22, 2002, which claims priority of U.S. Ser. No. 60/139,203 filed Jun. 15, 1999. Both of these applications are incorporated herein by reference.

FIELD OF THE INVENTION

The present invention relates generally to pipelines containing pressurized fluid, and more particularly to a junction for connecting adjacent pipes in a pipeline such that the pipeline is capable of accommodating accumulated thermal expansion in the pipes.

BACKGROUND OF THE INVENTION

Pipelines carrying pressurized fluid over long distances are known for a variety of applications. For example, vehicle systems have been proposed which comprise an elongated tubular guideway for storing and delivering pressurized fluid, typically air, to a vehicle for levitating and/or propelling the vehicle along the guideway. One such system is described, for example, in commonly owned U.S. patent application Ser. No. 08/912,245 filed Aug. 15, 1997, now U.S. Pat. No. 5,909,710. In such systems, the guideway itself is a twin tube pipeline made up of a plurality of pipes each having a pair of sealing bulkheads located at opposite ends thereof. The tube segments are joined end-to-end to define the guideway, which may include lateral supports for the vehicles or serve as a direct support or track for the vehicles. In many vehicle systems of the type thus far described, the pipes are elevated above ground by a series of supports spaced along the guideway.

A recognized problem, particularly in locations where wide variations in outdoor temperature are known to occur, is that of thermal expansion and contraction of the pipes forming the guideway or pipeline. The pipes must be supported and connected in a manner that allows for significant longitudinal (axial) thermal expansion while maintaining accurate guidance of the vehicles traveling therealong. This must be done while maintaining a pressure seal throughout the length of the pipeline/guideway, and allowing a continuous flow passage for filling and pressure recovery over the length of the pipeline/guideway. The axial thrust generated in the pipes by internal pressure should either be safely constrained or neutralized, and the stiffness and load carrying ability of the pipes should be compromised as infrequently as possible by joints and interconnections.

SUMMARY OF THE INVENTION

The present invention comprises a junction for joining a first section with an adjacent second section in a guideway carrying pressurized fluid. The junction comprises female end portions on a first section, male end portions on a second section partially received within the female end portions, and a vessel. The vessel comprises a plenum bounded at one end by a piston. The plenum is in flow communication with a pressure source.

Therefore, it is an object of the present invention to provide a pipeline junction for a single or twin tube guideway that compensates for pressure changes in the fluid and length changes in the pipeline.

BRIEF DESCRIPTION OF THE DRAWINGS

The nature and mode of operation of the present invention will now be more fully described in the following detailed description of the preferred embodiments taken with the accompanying drawing figures, in which:

FIG. 10 is a side view of a twin tube guideway junction formed in accordance with a seventh embodiment of the present invention, taken at Plane A—A in FIG. 8;

FIG. 11 is a side view of a twin tube guideway junction formed in accordance with a seventh embodiment of the present invention, showing the junction after thermal expansion of the guideway tubes, taken at Plane B—B in FIG. 9;

DETAILED DESCRIPTION OF THE PREFERRED EMBODIMENTS

Figure 1:
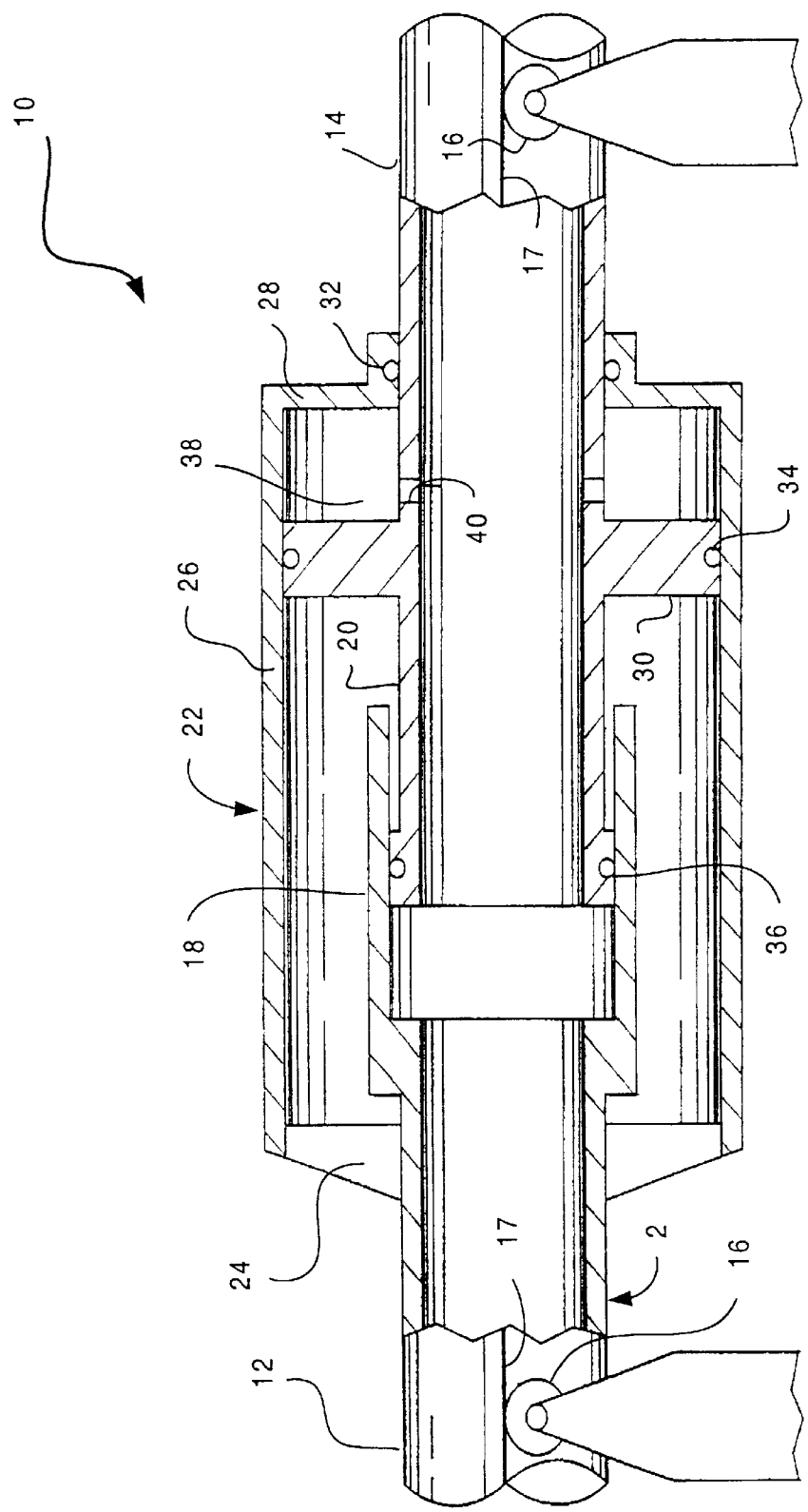
FIG. 1 is a longitudinal cross-sectional view of a pipeline junction formed in accordance with a first embodiment of the present invention.

Referring now to FIG. 1, a pipeline junction formed in accordance with a first embodiment of the present invention is shown and designated generally by the reference numeral 10. Junction 10 forms a connection between a first pipe 12 and a second pipe 14 adjacent thereto in a pipeline 2 in a manner designed to accommodate accumulated thermal expansion or contraction of the individual pipes making up the pipeline. As will be understood from the present specification, junction 10 compensates for thermal-induced increases in axial thrust tending to separate adjacent pipes in the pipeline by providing a plenum chamber wherein fluid pressure acts opposite to the axial thrust to maintain the connection between the pipes. For lengthy pipes fabricated of steel, for example pipes extending approximately five miles long, axially directed expansion of up to thirty-three feet must be accommodated. It is contemplated to space a plurality of junctions 10 at intervals along the length of pipeline 2 as dictated by design demands such as pipeline material, curves or direction changes in the pipeline, internal pressures, climate, etc. Pipes 12 and 14 are preferably supported by rollers 16 engaging the underside of external rails 17 on each lateral side of the pipe to allow axially directed expansion and contraction of the pipes.

First pipe 12 in FIG. 1 includes a female end portion 18 sized to slidably receive a fitted part of a male end portion 20 of second pipe 14. A vessel 22 is carried by first pipe 12 and includes a venting end 24 fixed to first pipe 12 at or near female end portion 18, a wall 26 extending in an axial direction beyond the extent of female end portion 18, and a closure end 28 extending radially inward for fitted closure about the exterior of second pipe 14. Male end portion 20 includes a radially enlarged flange 30 sized for slidable fit with vessel wall 26. A circumferential sealing member 32 is situated between sliding surfaces of closure end 28 and pipe 14 for maintaining a fluid tight seal at rest and during axially directed relative movement. Likewise, another circumferential sealing member 34 is provided between sliding surfaces of flange 30 and vessel wall 26 for maintaining a fluid tight seal even while axially directed relative movement takes place. Yet another circumferential sealing member 36 is preferably inserted between the exterior of male end portion and the interior of overlapping female end portion 18. Sealing members 32, 34, and 36 may be O-rings held within a corresponding groove or rolling seals, depending upon the configuration of the surfaces between which the particular sealing member acts. Consequently flange 30, wall 26, closure end 28, and the exterior of second pipe 14 cooperate to define an annular plenum chamber 38 having a volume that varies with the occurrence of axially directed thermal expansion and contraction of pipes 12 and 14.

In accordance with the present invention, plenum chamber 38 communicates with a source of pressurized fluid such that force is applied against the area of closure end 28 and against the area of flange 30 to counter axially directed thrust in pipeline 2 incident to a rise in temperature and resulting rise in internal pipeline pressure. In the first embodiment shown in FIG. 1, the source of pressurized fluid is the pipeline itself, which may be carrying pressurized air or some other fluid for a vehicle guideway or other application. Plenum chamber 38 preferably communicates with pipeline 2 via a plurality of ports 40 extending through second pipe 14 to the plenum chamber. Due to the open construction at venting end 24 of vessel 22, atmospheric pressure acts upon flange 30 opposite the plenum chamber pressure. As pressure within pipeline 2 increases, so does the pressure within plenum chamber 38, thereby countering axial thrust effects. As pipeline pressure decreases, a corresponding decrease in pressure within plenum chamber 38 occurs.

Figure 2:
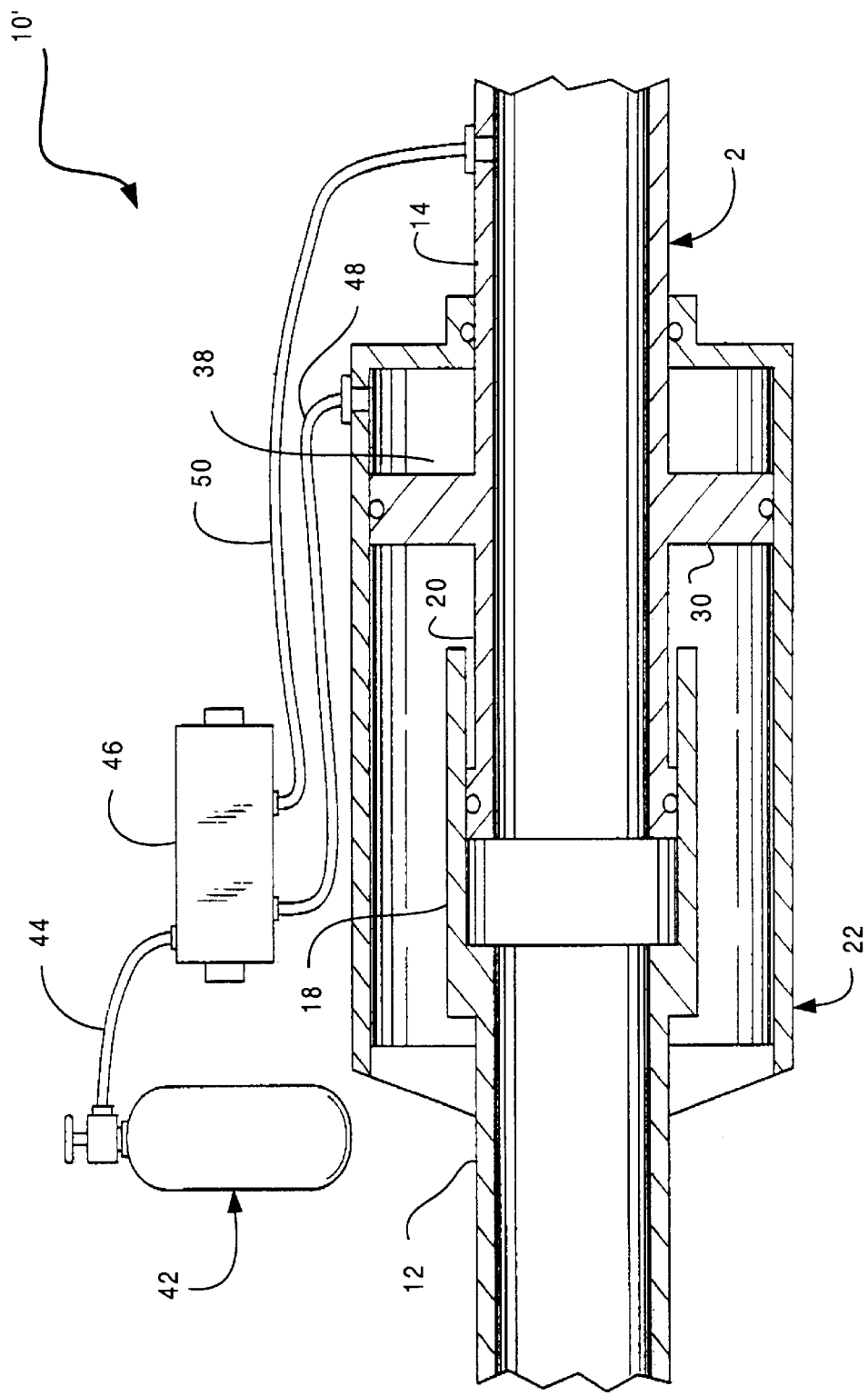
FIG. 2 is a longitudinal cross-sectional view of a pipeline junction formed in accordance with a second embodiment of the present invention similar to the first embodiment and employing an external source of pressurized fluid.

FIG. 2 shows junction 10' formed according to a second embodiment of the present invention. Junction 10' is structurally similar to junction 10 of the first embodiment, however an external source of pressurized fluid 42, rather than pipeline 2, communicates with plenum chamber 38 in a controlled manner. External source 42, represented symbolically by a pressure tank in FIG. 2, communicates with plenum chamber 38 by way of a line 44 connected to a pressure regulator 46 and a line 48 from the pressure regulator to the plenum chamber. External source 42 preferably supplies hydraulic or pneumatic pressurization to plenum chamber 38, however any suitable fluid may be used depending upon the specific application and environmental factors. A sampling line 50 is used for sensing pipeline pressure, thereby allowing pressure within the plenum chamber to be adjusted based on the pipeline pressure. The sensing of pipeline pressure and corresponding adjustment of pressure within plenum chamber 38 may be carried out by an entirely mechanical pressure regulator, or by an electromechanical pressure regulator that employs a transducer located within pipeline 2 or otherwise exposed to the pipeline pressure to provide a signal representative of the pipeline pressure. As pressure increases within pipeline 2, fluid from external source 42 is delivered to plenum chamber 38 to increase pressure therein for countering axial thrust effects. When pipeline pressure decreases, pressure regulator 46 provides for venting from plenum chamber 38 to atmosphere to decrease pressure in the plenum chamber.

Figure 3:
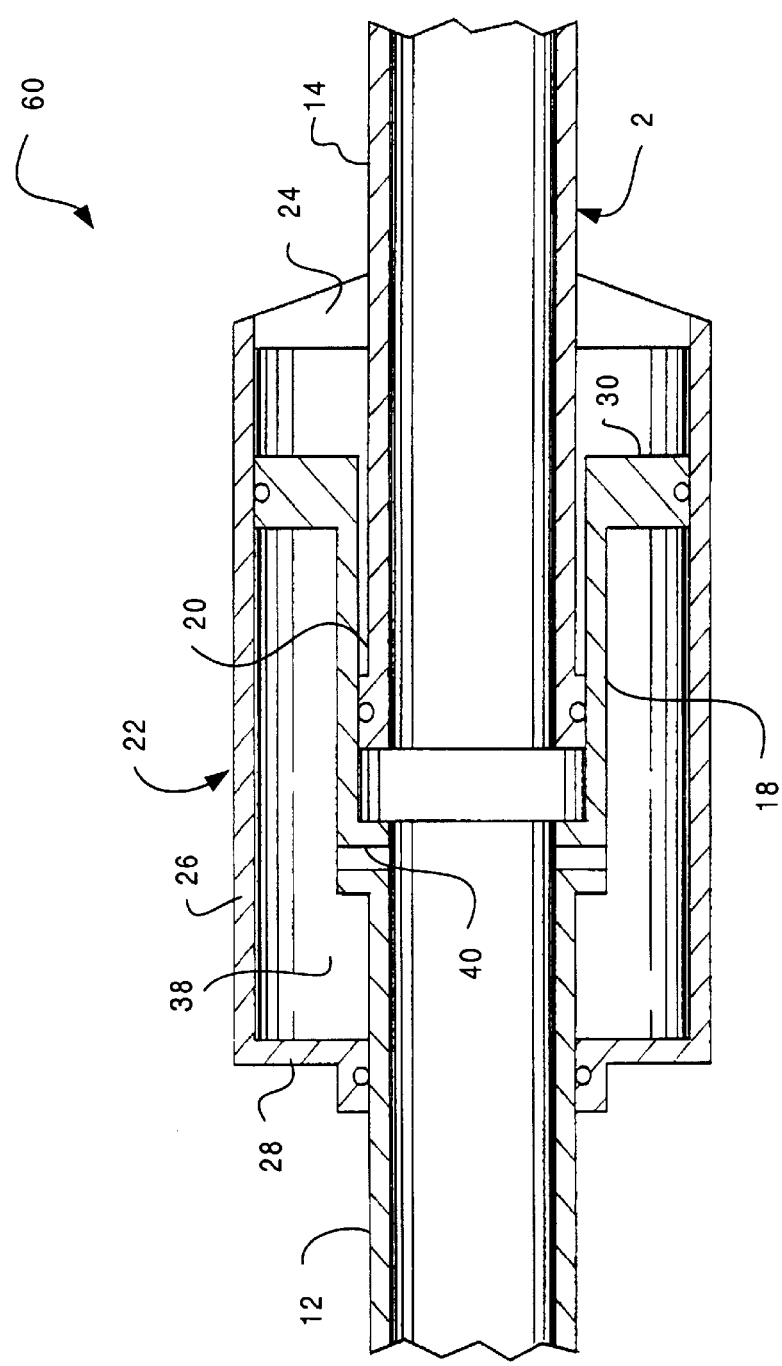
FIG. 3 is a longitudinal cross-sectional view of a pipeline junction formed in accordance with a third embodiment of the present invention.
Figure 4:
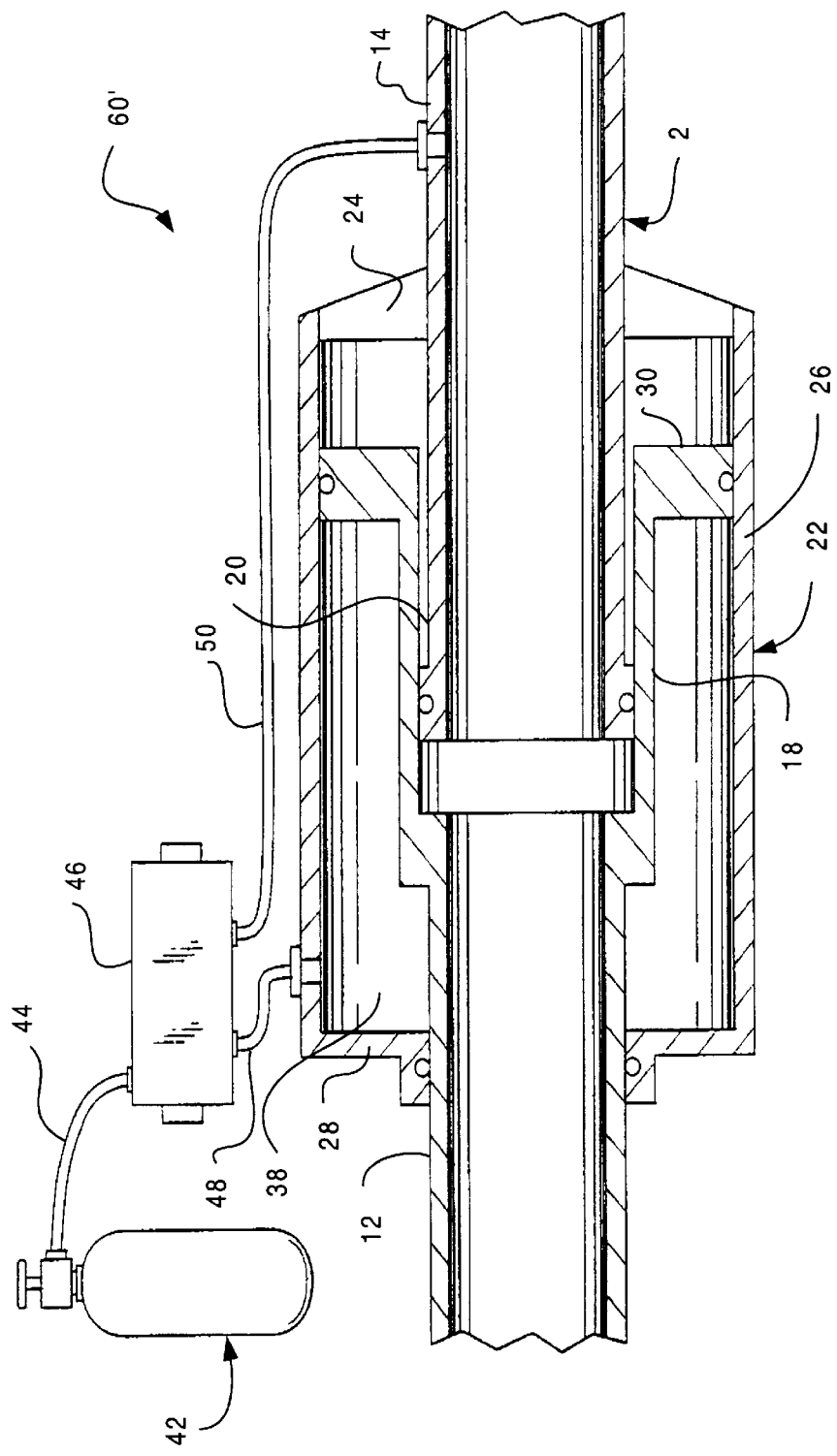
FIG. 4 is a longitudinal cross-sectional view of a pipeline junction formed in accordance with a fourth embodiment similar to the third embodiment and employing an external source of pressurized fluid.

A junction formed according to a third embodiment of the present invention is illustrated in FIG. 3 and designated generally by reference numeral 60. Junction 60 differs from junction 10 of the first embodiment in that venting end 24 of vessel 22 is now fixed to second pipe 14, while flange 30 is located on female end portion 18 of first pipe 12. In view of this alternative construction, the plurality of communication ports 40 between the interior of pipeline 2 and plenum chamber 38 are located through first pipe 12. FIG. 4 shows a fourth embodiment junction designated 60' that is substantially similar in construction to third embodiment 60, however it utilizes external source 42 rather than pipeline 2 to communicate with plenum chamber 38 in a manner analogous to that described above with respect to second embodiment junction 10' of FIG. 2.

Figure 5:
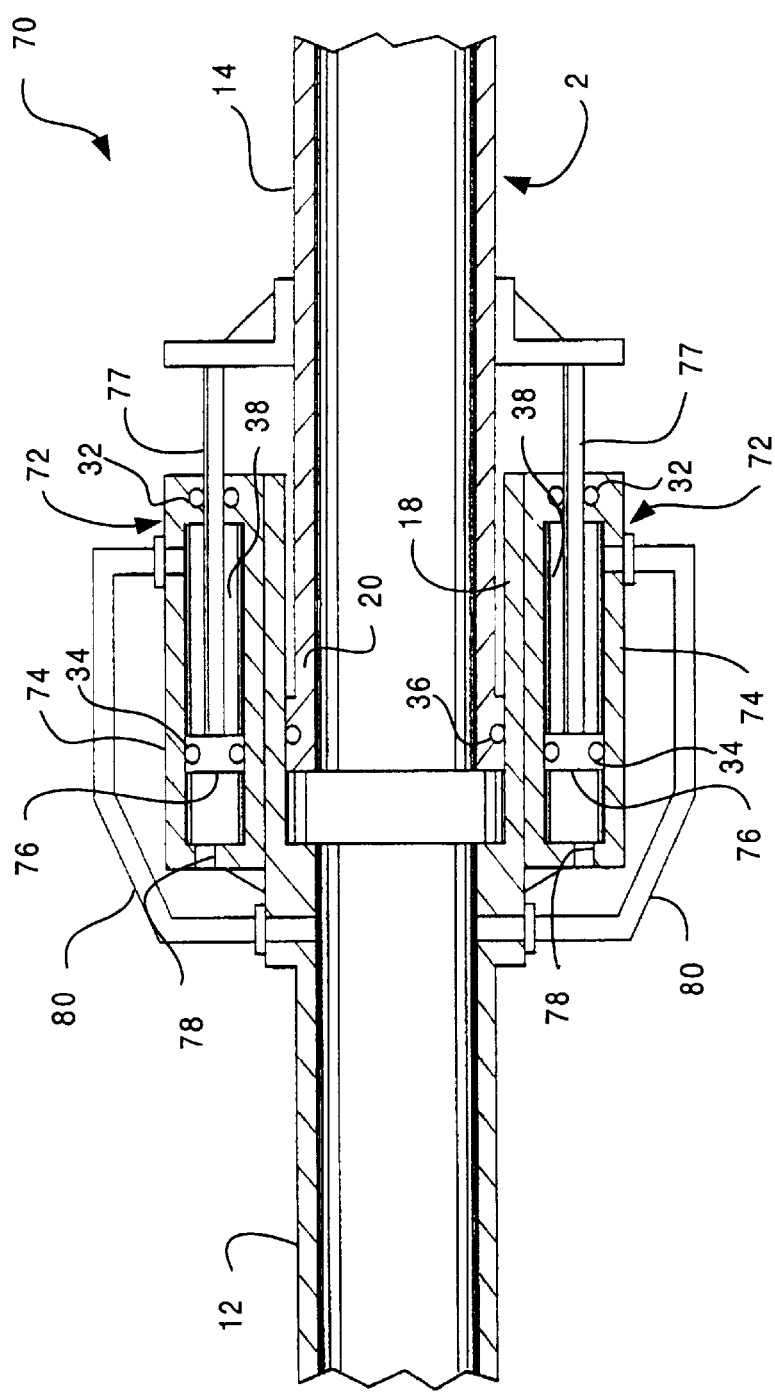
FIG. 5 is a longitudinal cross-sectional view of a pipeline junction formed in accordance with a fifth embodiment of the present invention.

Attention is now directed to FIG. 5, which shows a pipeline junction 70 formed in accordance with a fifth embodiment of the present invention. Junction 70 includes one or more retracting actuators 72 each comprising a cylinder 74 fixed to first pipe 12, and a corresponding piston 76 on a piston rod 77 fixed at one end to second pipe 14 to define a plenum chamber 38. Each actuator 72 includes a vent 78 to the atmosphere on a side of piston 76 opposite plenum chamber 38. A fluid tight sealing member 36 is provided between female end portion 18 and male end portion 20, and each actuator 72 includes fluid tight sealing members 32 and 34 between piston rod 77 and a closed end of cylinder 74 and between piston 76 and the internal wall of the cylinder, respectively. In the embodiment of FIG. 5, pipeline 2 serves as a source of pressurized fluid communicating with plenum chambers 38 through lines 80. As can be appreciated, when the total surface area of pistons 76 is the same as the pipe joint area being sealed, the repulsive force between the ends of the pipe is neutralized. The actuators 72 thereby perform the same temperature compensating function as the concentric configurations of the first through fourth embodiments by presenting equal areas to the pipeline area, such that the applied pressure counters the repelling force between female end portion 18 and male end portion 20.

Figure 6:
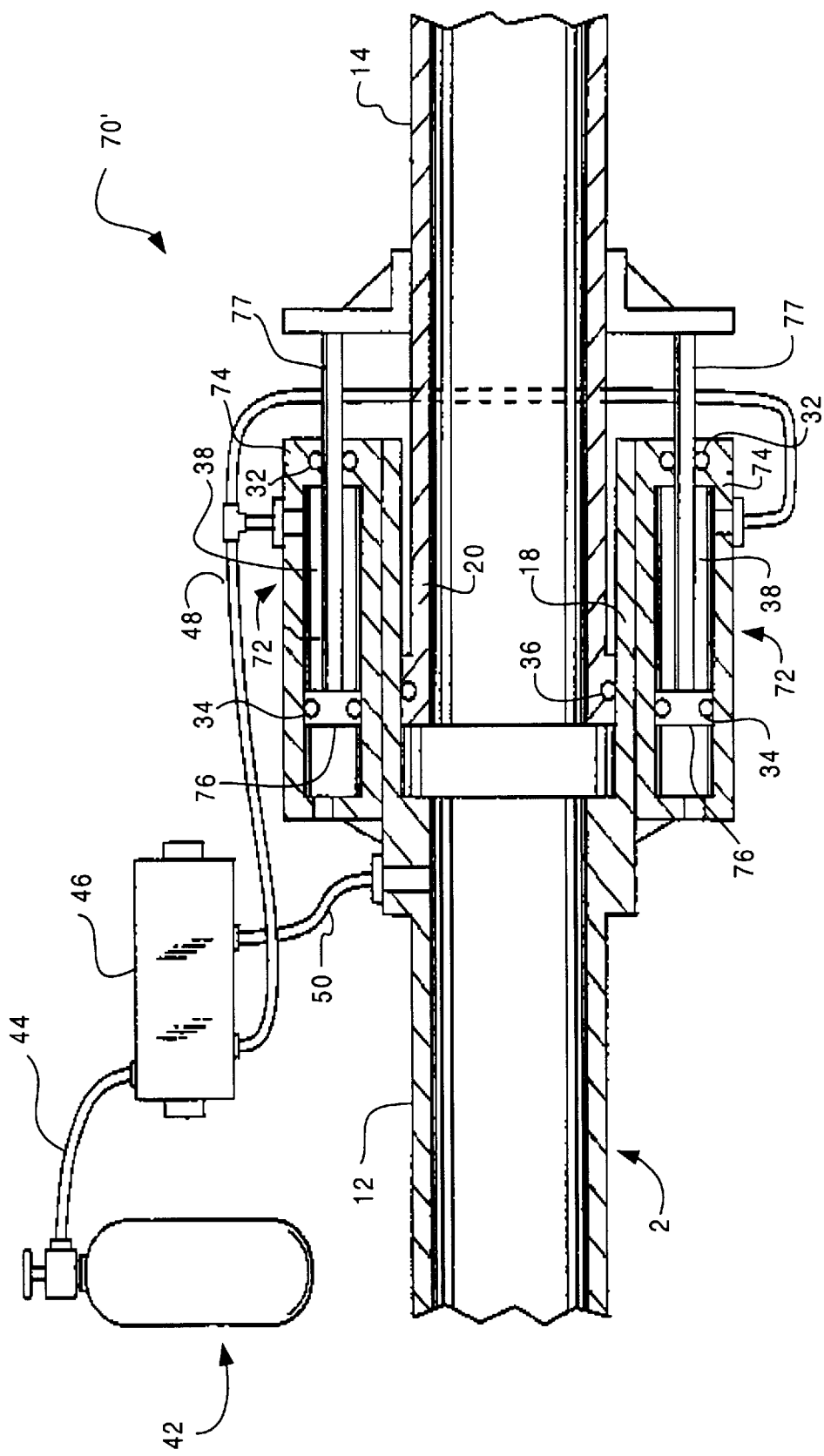
FIG. 6 is a longitudinal cross-sectional view of a pipeline junction formed in accordance with a sixth embodiment of the present invention similar to the fifth embodiment and employing an external source of pressurized fluid.

FIG. 6 shows a junction 70' formed according to a sixth embodiment of the present invention based largely on junction 70 of the fifth embodiment. Junction 70' includes external source 42 connected to each plenum chamber 38 through pressure regulator 46 for pressurizing the plenum chambers and venting the plenum chambers as internal pipe pressure rises and falls.

Of course, further embodiments analogous to those shown in FIGS. 5 and 6 are possible wherein cylinders 74 are fixed to second pipe 14 at or near male end portion 20, and piston rods 77 are fixed to first pipe 12. One such embodiment would have the plenum chambers in communication with pipeline 2, while another such embodiment would have the plenum chambers in communication with external source 42 through pressure regulator 46.

Figure 7:
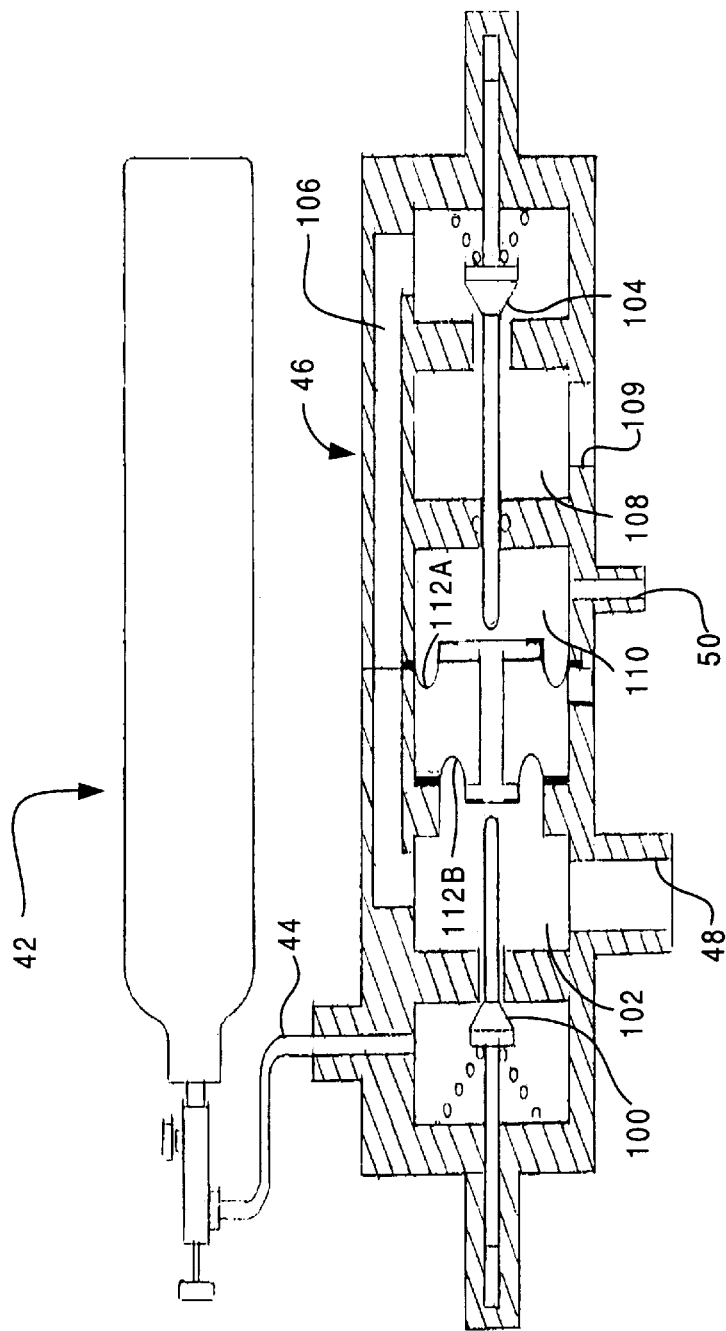
FIG. 7 is a sectional schematic view showing a pressure regulator for use in connection with the present invention.

In instances where it is desirable to prevent internal exposure of the actuating surfaces to the pipeline fluid, such as when the pipeline fluid is corrosive or "sludge-like," or in instances where it is desirable to use smaller and higher pressure actuators employing a different actuating fluid from the pipeline fluid, the fluid within plenum chamber 38 can be isolated from the pipeline fluid by a diaphragm located between each fluid. This diaphragm can be an integral part of pressure regulator 46. FIG. 7 shows one possible configuration of pressure regulator 46 that achieves fluid separation by incorporating a pair of pressure ratio diaphragms. Pressure regulator 46 in FIG. 7 is designed to control the pressure within plenum chambers 38 to be equal to the pipeline pressure or to some multiple thereof. In the latter case, the use of higher plenum chamber pressures would reduce the surface area requirements of the plenum chamber or chambers. Pressure regulator 46 operates by delivering fluid from external source 42 to each plenum chamber 38, or by venting fluid from plenum chamber 38 to atmosphere, to maintain a predetermined ratio between the pipeline pressure and the plenum chamber pressure. Pressure regulator 46 includes a supply valve 100 for controlling flow between external source 42 and a supply chamber 102 of the pressure regulator, and a venting valve 104 controlling flow through a passage 106 between supply chamber 102 and a venting chamber 108, which in turn communicates with ambient atmosphere through a vent port 109. Supply valve 100 and venting valve 104 are operably coupled with a pipeline sensing chamber 110 by pressure ratio diaphragms 112A and 112B positioned between supply chamber 102 and sensing chamber 110. When the ratio of the pipeline pressure to plenum chamber pressure exceeds a predetermined value, 20 supply valve 100 is forced open by the action of diaphragms 112A, 112B and venting valve 104 is held closed by spring bias, thereby allowing flow from external source 42 through the supply valve, supply chamber, and line 48 to plenum chamber 38 until the predetermined pressure ratio is once again achieved. Conversely, when the ratio of the pipeline pressure to plenum chamber pressure drops below the predetermined value, venting valve 104 is forced open by the action of diaphragms 112A, 112B and supply valve 100 is held closed by spring bias, thereby allowing flow from plenum chamber 38 through line 48, supply chamber 102, passage 106, venting valve 104, venting chamber 108, and vent port 109 to atmosphere until the predetermined pressure ratio is reached. In addition to maintaining a desired pressure ratio, pressure regulator 46 of FIG. 7 keeps the pipeline and plenum chamber fluids separated at all times.

Of course, other types of pressure regulators, including electro-mechanical pressure regulators, can be substituted for the pressure regulator shown in FIG. 7 without departing from the scope of the present invention as set forth in the claims.

Figure 8:
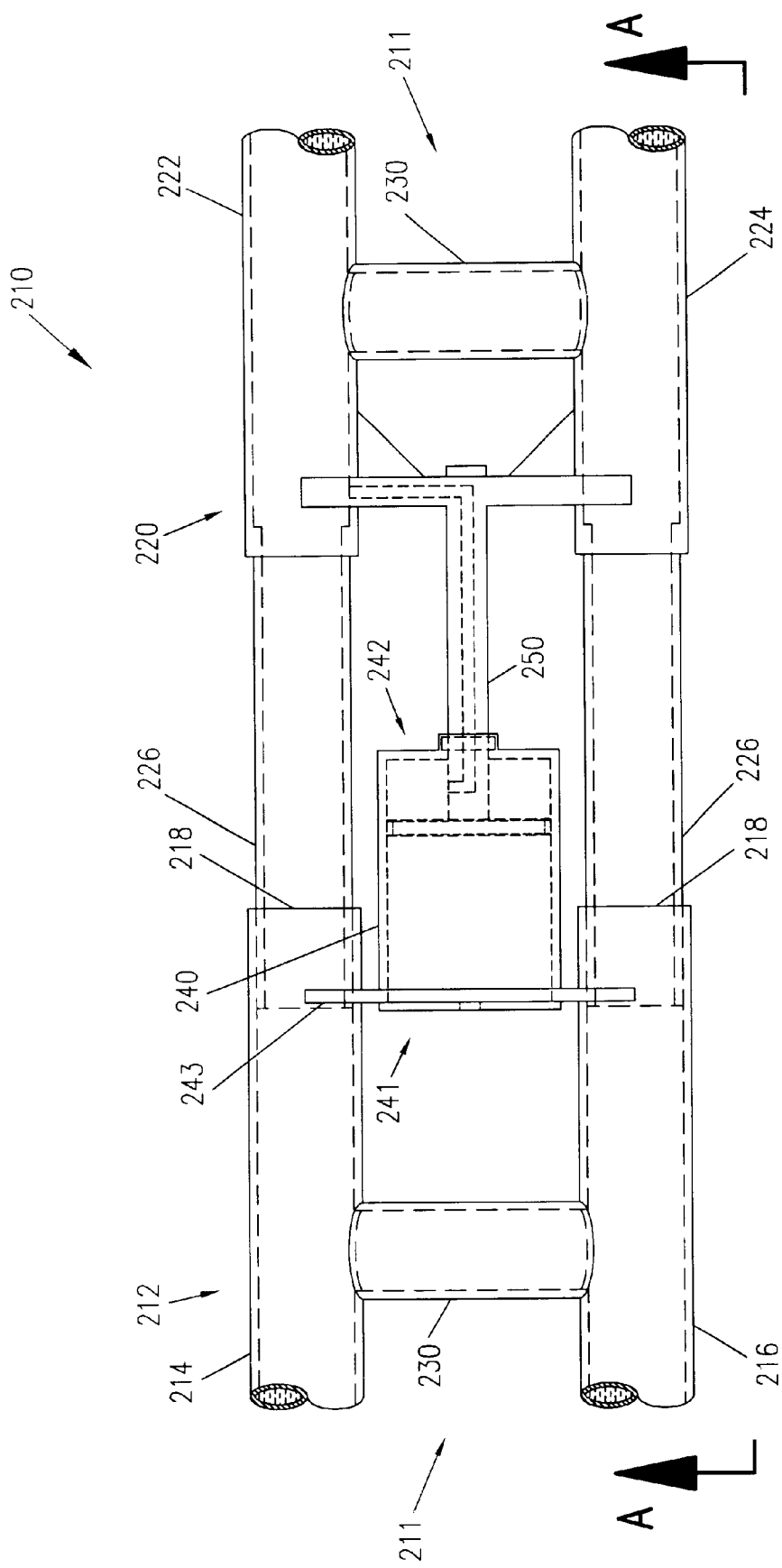
FIG. 8 is a top view of a twin tube guideway junction formed in accordance with a seventh embodiment of the present invention.

Referring now to FIGS. 8 and 10, a twin tube guideway junction formed in accordance with a seventh embodiment of the present invention is shown and designated generally by the reference numeral 210. Junction 210 forms a connection between a first section 212 and a second section 220 adjacent thereto in a manner designed to accommodate accumulated thermal expansion or contraction of the individual pipes making up guideway 211. First section 212 is made up of first pipe 214 and second pipe 216. Second section 220 is made up of first pipe 222 and second pipe 224. Both first section 212 and second section 220 include cross flow tubes 230.

Figure 12:
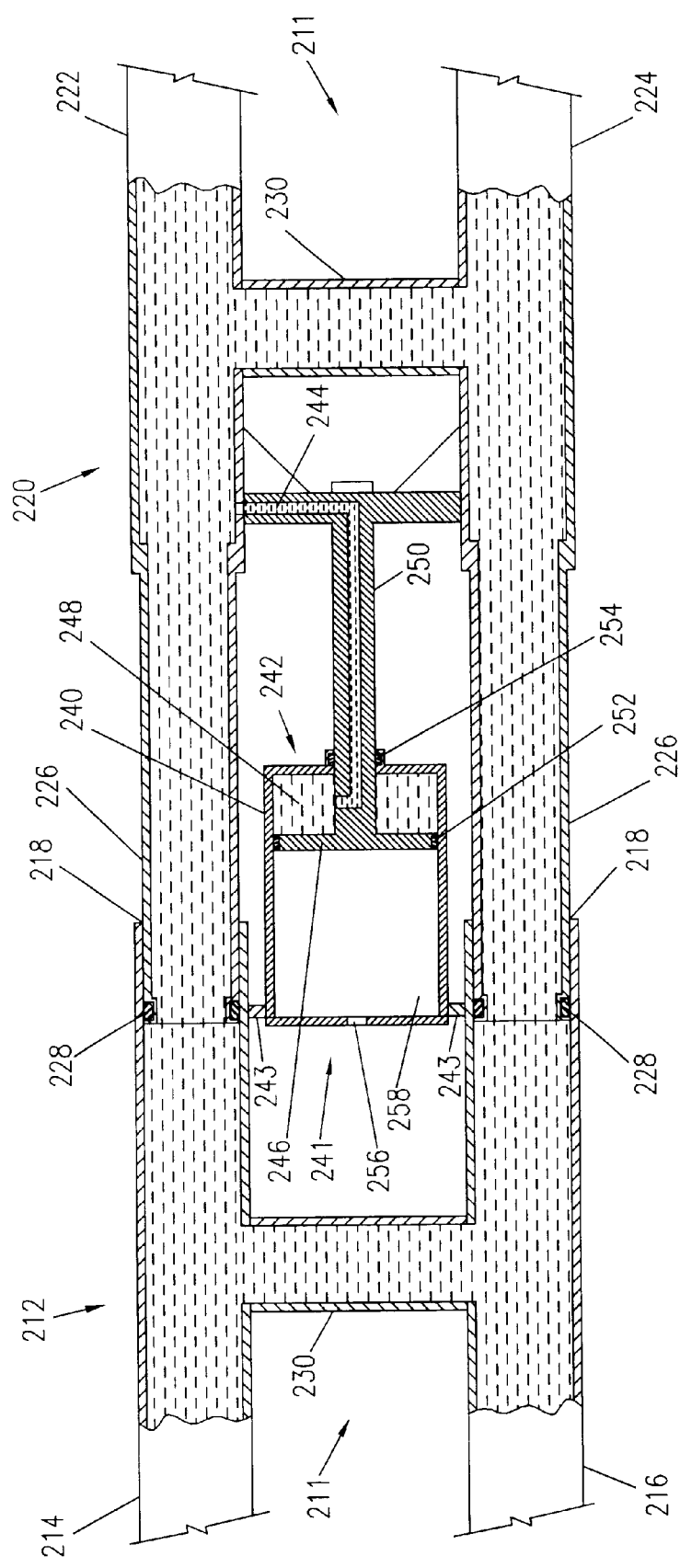
FIG. 12 is a top cross-sectional view of a twin tube guideway junction formed in accordance with a seventh embodiment of the present invention, taken at Plane C—C in FIG. 10.

In the first section 212, first pipe 214 and second pipe 216 in FIG. 12 include a female end portion 218 sized to slidably receive a fitted part of a male end portion 226 of first and second pipes 222 and 224 of second section 220. A circumferential sealing member 228 is situated between sliding surfaces of male end portions 226 and female end portions 218 maintaining a fluid tight seal at rest and during axially directed relative movement. A vessel 240 is located between the pipes of guideway 211. Vessel 240 is connected at a first end 241 to the pipes of the guideway by structural supports 243. At a second end 242, piston shaft 250 extends into vessel 240. Piston 246 is at the end of piston shaft 250. Piston 246, the interior wall of vessel 240, and the exterior of piston shaft 250 cooperate to define annular fluid plenum 248 having a volume that varies with the occurrence of axially directed thermal expansion and contraction of sections 212 and 220. Fluid plenum 248 is in flow communication with the guideway pipes through passage 244. Passage 244 is shown in FIG. 12 to lead to pipe 222, but it should be readily apparent to one skilled in the art that any of the four pipes can be used, and all of these configurations are within the spirit and scope of the invention as claimed. A circumferential sealing member 252 is situated between sliding surfaces of piston 246 and the wall of vessel 240 maintaining a fluid tight seal at rest and during axially directed relative movement. Circumferential sealing member 254 is situated between the sliding surfaces of piston shaft 250 and the wall of vessel 240. Vent 256 is located in the wall of vessel 240 at the first end 241, allowing air plenum 258 to be in communication with the outside atmosphere.

In accordance with the present invention, fluid plenum 248 communicates with the pressurized fluid in guideway 211 such that force is applied against the piston 246 and against the area of second end 242 of vessel 240 to counter axially directed thrust in guideway 211 incident to a rise in temperature and resulting rise in internal guideway pressure. Due to vent 256 at first end 241 of vessel 240, atmospheric pressure acts upon piston 246 opposite the fluid plenum pressure. As pressure within guideway 211 increases, so does the pressure within fluid plenum 248, thereby countering axial thrust effects. As guideway pressure decreases, a corresponding decrease in pressure within fluid plenum 248 occurs.

Figure 9:
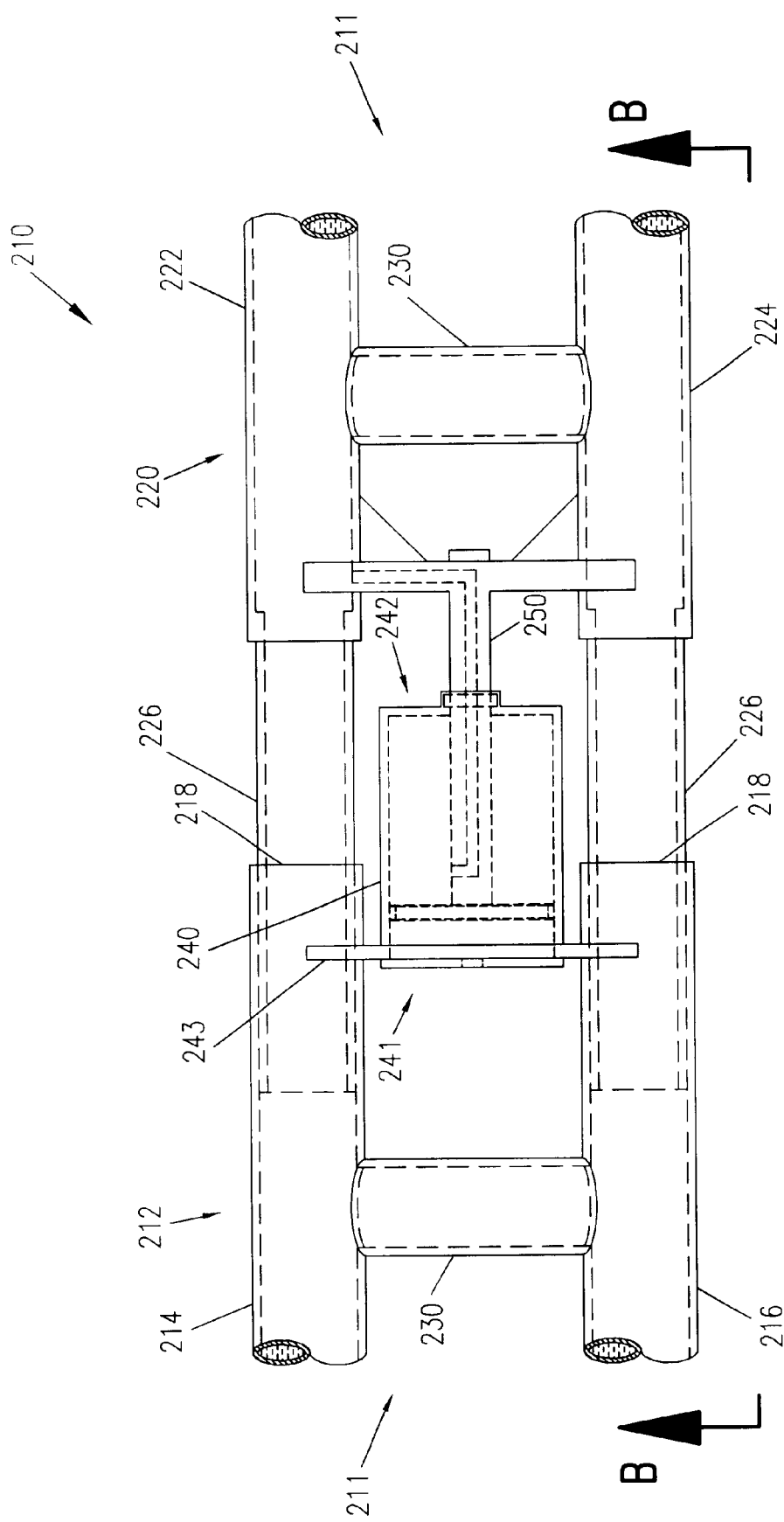
FIG. 9 is a top view of a twin tube guideway junction formed in accordance with a seventh embodiment of the present invention, showing the junction after thermal expansion of the guideway tubes.
Figure 13:
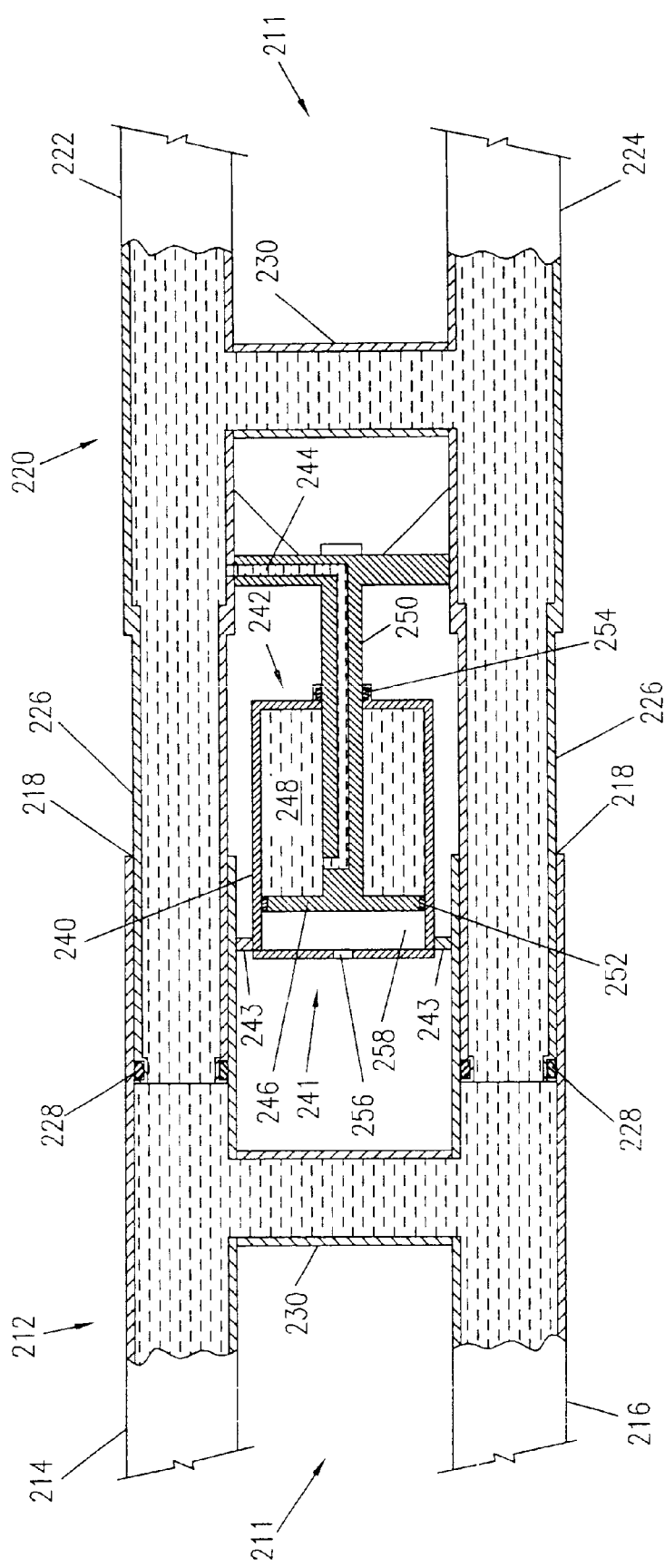
FIG. 13 is a top cross-sectional view of a twin tube guideway junction formed in accordance with a seventh embodiment of the present invention, showing the junction after thermal expansion of the guideway tubes, taken at Plane D—D of FIG. 11.

FIGS. 8, 10, and 12 show the guideway junction with the pipes at their nominal length. FIGS. 9, 11, and 13 show the guideway junction after the pipes have lengthened due to thermal expansion. Piston 246 has been forced into vessel 240 towards first end 241. Fluid plenum 248 has increased in volume, and more fluid from second pipe 222 has entered fluid plenum 248 through passage 244. Air plenum 258 has been reduced in volume. Air has left air plenum 258 through vent 256. This reduces the fluid pressure in the guideway, which would have otherwise increased due to the increase in temperature.

If the guideway then cools, the junction returns to the configuration shown in FIGS. 8, 10, and 12. The piston is drawn back towards second end 242 of vessel 240. Air plenum 258 increases in volume, which draws air through vent 256. Fluid plenum 248 decreases in size, and fluid returns to the guideway through passage 244. This will increase the pressure in the guideway, which otherwise would have dropped due to the decrease in temperature.

Thus, it is seen that the objects of the present invention are efficiently obtained, although modifications and changes to the invention should be readily apparent to those having ordinary skill in the art, and these modifications are intended to be within the spirit and scope of the invention as claimed.

What I claim is:

1. A junction for a twin tube guideway carrying pressurized fluid, said junction comprising:

female end portions on a first pipe and a second pipe of a first section;

male end portions on a first pipe and a second pipe of a second section partially received within said female end portions; and a vessel comprising a plenum bounded at one end by a piston, said plenum in flow communication with one of said pipes, said piston connected to said one of said pipes in flow communication with said plenum.

2. The junction recited in claim 1 wherein said one of said pipes in flow communication with said plenum is said first pipe of said first section.

3. The junction recited in claim 1 wherein said one of said pipes in flow communication with said plenum is said second pipe of said first section.

4. The junction recited in claim 1 wherein said one of said pipes in flow communication with said plenum is said first pipe of said second section.

5. The junction recited in claim 1 wherein said one of said pipes in flow communication with said plenum is said second pipe of said second section.

6. The junction recited in claim 1, further comprising a sealing member between said piston and an internal wall of said vessel for providing a fluid-tight seal while permitting axially directed relative movement between said piston and said internal wall of said vessel.

7. The junction recited in claim 1 further comprising a sealing member between said male end portions and said female end portions of said pipes for providing a fluid-tight seal while permitting axially directed relative movement between said first section and said second section.

* * * * *